United States Patent
Hayman et al.

(10) Patent No.: US 8,915,081 B2
(45) Date of Patent: *Dec. 23, 2014

(54) INTERNAL COMBUSTION ENGINE

(75) Inventors: Alan W. Hayman, Romeo, MI (US); Rodney E. Baker, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

This patent is subject to a terminal disclaimer.

(21) Appl. No.: 13/362,291

(22) Filed: Jan. 31, 2012

(65) Prior Publication Data

US 2012/0260895 A1  Oct. 18, 2012

Related U.S. Application Data

(60) Provisional application No. 61/474,972, filed on Apr. 13, 2011.

(51) Int. Cl.
*F02B 33/44* (2006.01)
*F02M 25/07* (2006.01)
(Continued)

(52) U.S. Cl.
CPC ............ *F02B 47/08* (2013.01); *F02M 25/0727* (2013.01); *F02M 25/0712* (2013.01); *F02B 39/00* (2013.01); *F02B 37/00* (2013.01); *Y02T 10/121* (2013.01); *F02M 25/0705* (2013.01); *Y02T 10/144* (2013.01); *F02B 33/34* (2013.01); *F02M 25/0749* (2013.01); *F02B 29/0406* (2013.01)
USPC .................. 60/605.2; 701/108; 123/568.11; 123/568.13

(58) Field of Classification Search
CPC .......... F02B 33/34; F02B 37/00; F02B 39/00; F02B 47/08; F02B 29/0406; F02B 2075/125; F02M 25/0705; F02M 25/0712; F02M 25/0749; F02M 25/0727; F02M 25/0703; F02M 25/0722; F02D 2009/0288; Y02T 10/121; Y02T 10/144

USPC .......... 60/605.2; 123/568.11, 568.12, 568.17, 123/568.2; 701/108
IPC ....................................... F02M 25/07
See application file for complete search history.

(56) References Cited

U.S. PATENT DOCUMENTS 4,033,306 A  7/1977  Sugihara et al.
4,186,699 A  2/1980  Aoyama
(Continued)

FOREIGN PATENT DOCUMENTS

CN  101137835 A  3/2008
CN  101255822 A  9/2008
(Continued)

OTHER PUBLICATIONS

Chinese Office Action for Application No. 201210161748.0 dated Jan. 6, 2014; 7 pages.
(Continued)

*Primary Examiner* — Thai Ba Trieu
(74) *Attorney, Agent, or Firm* — Cantor Colburn LLP (57) ABSTRACT

An internal combustion engine comprises a compressor disposed in an intake system configured to compress combustion air and deliver it to cylinders of the engine. A compressor inlet assembly has a combustion air inlet, in fluid communication with, and configured to receive combustion air from the intake system. A combustion air passage extends through the assembly to an outlet located downstream of the inlet and is configured for fluid communication with the compressor. An EGR mixing conduit is disposed within the compressor inlet assembly and has an EGR inlet configured for fluid communication with, and receipt of EGR from, an EGR supply conduit. An EGR passage extends from the EGR inlet to an EGR supply annulus disposed about the combustion air inlet opening and a plurality of EGR ports extend between the EGR supply annulus and the combustion air passage for delivery of EGR thereto.

12 Claims, 6 Drawing Sheets

(51) Int. Cl.
*F02B 47/08* (2006.01)
*F02B 39/00* (2006.01)
*F02B 37/00* (2006.01)
*F02B 33/34* (2006.01)
*F02B 29/04* (2006.01)

(56) References Cited

U.S. PATENT DOCUMENTS

| | | | |
|---|---|---|---|
| 4,249,382 A * | 2/1981 | Evans et al. | 60/605.2 |
| 4,323,045 A | 4/1982 | Yamashita | |
| 4,391,240 A | 7/1983 | Sugasawa et al. | |
| 5,517,976 A * | 5/1996 | Bachle et al. | 60/605.2 |
| 5,562,085 A | 10/1996 | Kosuda et al. | |
| 5,791,146 A * | 8/1998 | Dungner | 60/605.2 |
| 5,794,445 A * | 8/1998 | Dungner | 60/605.2 |
| 5,894,726 A | 4/1999 | Monnier | |
| 5,934,263 A | 8/1999 | Russ et al. | |
| 6,009,709 A | 1/2000 | Bailey | |
| 6,053,154 A | 4/2000 | Pott | |
| 6,082,100 A | 7/2000 | Boegner et al. | |
| 6,138,650 A | 10/2000 | Bailey | |
| 6,141,959 A * | 11/2000 | Digeser et al. | 60/274 |
| 6,230,682 B1 * | 5/2001 | Gustafsson et al. | 60/605.2 |
| 6,237,335 B1 * | 5/2001 | Lonnqvist | 60/605.2 |
| 6,269,791 B1 | 8/2001 | Tanaka et al. | |
| 6,286,489 B1 | 9/2001 | Bailey | |
| 6,295,815 B1 | 10/2001 | Bechle et al. | |
| 6,298,835 B1 | 10/2001 | Horie et al. | |
| 6,668,548 B1 | 12/2003 | Asanuma et al. | |
| 6,742,506 B1 * | 6/2004 | Grandin | 123/568.12 |
| 6,752,132 B2 * | 6/2004 | Remmels et al. | 123/568.12 |
| 6,789,531 B1 * | 9/2004 | Remmels | 60/605.2 |
| 6,804,953 B2 | 10/2004 | Kondo | |
| 6,877,492 B1 | 4/2005 | Osterwald | |
| 7,059,308 B2 | 6/2006 | Eitel et al. | |
| 7,281,531 B1 | 10/2007 | Fulton et al. | |
| 7,287,378 B2 | 10/2007 | Chen et al. | |
| 7,387,116 B2 | 6/2008 | Elsasser | |
| 7,426,830 B2 * | 9/2008 | Schorn et al. | 60/605.2 |
| 7,490,466 B2 | 2/2009 | Robel et al. | |
| 7,568,340 B2 * | 8/2009 | Marsal et al. | 60/605.2 |
| 7,591,256 B2 | 9/2009 | Elsasser et al. | |
| 7,624,575 B2 * | 12/2009 | Noelle et al. | 60/605.2 |
| 7,721,542 B2 * | 5/2010 | Chen | 60/605.2 |
| 7,788,923 B2 * | 9/2010 | Rowells | 60/605.2 |
| 8,161,747 B2 | 4/2012 | Pierpont et al. | |
| 8,176,737 B2 | 5/2012 | Pierpont et al. | |
| 8,291,891 B2 | 10/2012 | Alger, II et al. | |
| 8,561,599 B2 | 10/2013 | Gingrich et al. | |
| 2002/0069861 A1 * | 6/2002 | Sakamoto | 123/568.17 |
| 2002/0069862 A1 | 6/2002 | Faletti | |
| 2002/0189598 A1 * | 12/2002 | Remmels et al. | 123/568.12 |
| 2005/0199229 A1 | 9/2005 | Eitel et al. | |
| 2006/0101819 A1 * | 5/2006 | Schorn et al. | 60/605.2 |
| 2006/0174621 A1 | 8/2006 | Chen et al. | |
| 2007/0130947 A1 * | 6/2007 | Baumgard et al. | 60/605.2 |
| 2007/0175215 A1 * | 8/2007 | Rowells | 60/605.2 |
| 2008/0167791 A1 | 7/2008 | Fulton et al. | |
| 2009/0199825 A1 * | 8/2009 | Piper et al. | 60/605.2 |
| 2009/0255251 A1 * | 10/2009 | Paffrath | 60/605.2 |
| 2010/0024416 A1 | 2/2010 | Gladden et al. | |
| 2010/0037601 A1 | 2/2010 | Pierpont | |
| 2010/0292910 A1 | 11/2010 | Gibble | |
| 2011/0041495 A1 * | 2/2011 | Yager | 60/605.2 |
| 2011/0067397 A1 * | 3/2011 | Hirth et al. | 60/605.2 |
| 2011/0253113 A1 | 10/2011 | Roth et al. | |
| 2011/0302917 A1 | 12/2011 | Styles et al. | |
| 2012/0000448 A1 | 1/2012 | Freund et al. | |
| 2012/0078492 A1 * | 3/2012 | Freund et al. | 701/108 |
| 2012/0204844 A1 * | 8/2012 | Gingrich et al. | 123/568.11 |
| 2012/0204845 A1 * | 8/2012 | Gingrich et al. | 123/568.17 |
| 2012/0216530 A1 * | 8/2012 | Flynn et al. | 60/605.2 |
| 2012/0222659 A1 | 9/2012 | Kulkarni et al. | |
| 2012/0260897 A1 * | 10/2012 | Hayman et al. | 123/568.2 |
| 2013/0000614 A1 * | 1/2013 | Freund et al. | 123/568.2 |
| 2013/0152909 A1 * | 6/2013 | Choi et al. | 123/568.12 |

FOREIGN PATENT DOCUMENTS

| | | | |
|---|---|---|---|
| CN | 101595294 A | 12/2009 | |
| CN | 102007283 A | 4/2011 | |
| DE | 19809862 A1 * | 9/1999 | F02M 25/07 |
| DE | 10310649 A1 * | 11/2004 | F02M 25/07 |
| DE | 10357402 A1 | 7/2005 | |
| EP | 1152141 A1 * | 11/2001 | F02M 25/07 |
| JP | 05195879 A * | 8/1993 | F02M 25/07 |
| JP | 2007126995 A | 5/2007 | |
| JP | 2007154675 A * | 6/2007 | F02M 25/07 |
| KR | 20020055744 A | 7/2002 | |
| WO | WO 9943943 A1 * | 9/1999 | F02M 25/07 |
| WO | 2006111280 A1 | 10/2006 | |
| WO | 2007008196 A1 | 1/2007 | |

OTHER PUBLICATIONS

Chinese Office Action for Application No. 201210107868.2 dated Jan. 16, 2014; 8 pages.

* cited by examiner

FIG. 8

INTERNAL COMBUSTION ENGINE

CROSS-REFERENCES TO RELATED APPLICATIONS

This patent application claims priority to U.S. Patent Application Ser. No. 61/474,972 filed Apr. 13, 2011 which is hereby incorporated herein by reference in its entirety.

FIELD OF THE INVENTION

Exemplary embodiments of the invention relate to internal combustion engines having exhaust gas recirculation systems and, more particularly to an internal combustion engine having an engine cylinder dedicated to the production and supply of recirculated exhaust gas to another cylinder of the engine and apparatus for delivery thereto.

BACKGROUND

With increased focus on vehicle economy, automotive manufacturers are turning to smaller, lighter vehicles and unique vehicle powertrains to boost efficiency. Recirculated exhaust gas ("EGR") is utilized in most conventional internal combustion engines to assist in the reduction of throttling losses at low loads, and to improve knock tolerance and reduce the level of oxides of nitrogen ("$NO_x$") in the exhaust gas. EGR is especially important as an emissions reducer in internal combustion engines that run lean of stoichiometry and are, as such, prone to emitting higher levels of $NO_x$ emissions.

One proposition that has been considered in the construction of internal combustion engine systems is to utilize one, or a plurality of cylinders as a dedicated EGR source. Specifically, in a four cylinder engine for instance, two or three of the four cylinders will run at normal air, fuel and EGR mixtures (working cylinders). The exhaust gas produced by these cylinders will exit the internal combustion engine as exhaust gas and be treated in an exhaust gas treatment system prior to its release to the atmosphere. One or two of the four cylinders is operated at customized levels of air and fuel (EGR cylinders); as may be determined by an engine controller that is in signal communication with various engine, vehicle and exhaust system sensors. The exhaust gas produced in these cylinders is transferred to the intake ports of the other cylinders to provide EGR. Such a configuration allows for richer EGR, which contains higher levels of Hydrogen, thereby improving knock resistance, fuel consumption and combustion stability while still allowing stoichiometrically combusted exhaust gas to be maintained in the exhaust gas treatment system for compatibility with the catalytic treatment devices.

A challenge is to deliver uniform volumes of EGR to the intake manifold upstream of a compressor, such as an engine driven supercharger or an exhaust driven turbocharger, to thereby promote an even distribution and mixing of the exhaust gas with combustion air for delivery of a homogeneous combustion charge to the working cylinders over a broad range of operating conditions.

SUMMARY

In an exemplary embodiment an internal combustion engine comprises a working cylinder, an EGR cylinder, an intake system for supplying combustion air to the cylinders, a first exhaust system for removing exhaust gas from the working cylinder and to the atmosphere, a second exhaust system for removing exhaust from the EGR cylinder and supplying the exhaust gas through an EGR supply conduit to the intake system, a compressor disposed in the intake system and configured to compress the combustion air and deliver it to the working cylinder and the EGR cylinder, a compressor inlet assembly having a combustion air inlet opening, in fluid communication with, and configured to receive combustion air from the intake system, a combustion air passage extending through the compressor inlet assembly to a combustion air outlet located downstream of the combustion air inlet opening and configured for fluid communication with the compressor, an EGR mixing conduit disposed within the compressor inlet assembly and having an EGR inlet configured for fluid communication with, and receipt of EGR from, the EGR supply conduit, an EGR passage extending from the EGR inlet to an EGR supply annulus disposed about the combustion air inlet opening and a plurality of EGR ports extending between the EGR supply annulus and the combustion air passage to thereby fluidly connect the EGR supply annulus therewith for delivery of EGR thereto, wherein the combustion air charge delivered to the cylinders is a combination of combustion air and EGR.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

The invention described in various embodiments herein comprises a novel apparatus and method for the supply of exhaust gas to the cylinders of an internal combustion engine (i.e. regenerated exhaust gas "EGR"). As discussed above, EGR is useful in maintaining several performance parameters of the internal combustion engine including maintaining reduced levels of oxides of nitrogen ("$NO_x$") which is a regulated exhaust constituent and is more prevalent in engines that are operated on the lean side (i.e. excess oxygen) of stoichiometry. The basic premise of the invention is to provide an internal combustion engine with two configurations of cylinders; a first "working type" and a second "EGR type". While all cylinders are operated in a manner that provides work output from the engine, the first, working type is operated at normal air/fuel ratios that deliver optimum power and appropriate exhaust emissions to an exhaust treatment system. The second, EGR type is operated in a manner that may not necessarily deliver optimum power and appropriate exhaust emissions but, instead delivers optimal EGR directly to the intake ports of the first, working type of cylinders. Mechanically, the exhaust ports of the second, EGR type of cylinders are fluidly connected to the intake system of the internal combustion engine and not directly to the exhaust treatment system. The path for the exhaust from these cylinders to the exhaust treatment system is by recirculation through the intake system and through the first, working type cylinders.

Optimization of the internal combustion engine preferably will result in a consistent, reliable supply of EGR to each working cylinder at the appropriate time for optimal performance of that working cylinder. In addition, the combustion charge entering the cylinders should be a homogeneous mixture of combustion air and recirculated exhaust gas. As should be apparent, it is contemplated that the invention is applicable to many configurations of internal combustion engines without deviating from the scope thereof. For example, a 2-cylinder engine may comprise one working cylinder and one EGR cylinder, a 3-cylinder engine may comprise two working cylinders and one EGR cylinder operating on a two stroke cycle, a 4-cylinder engine may comprise two or three working cylinders and one or two EGR cylinders, a 6-cylinder engine may comprise three working cylinders and three EGR cylinders, an 8-cylinder engine may comprise four working cylinders and four EGR cylinders, etc.

Figure 1:
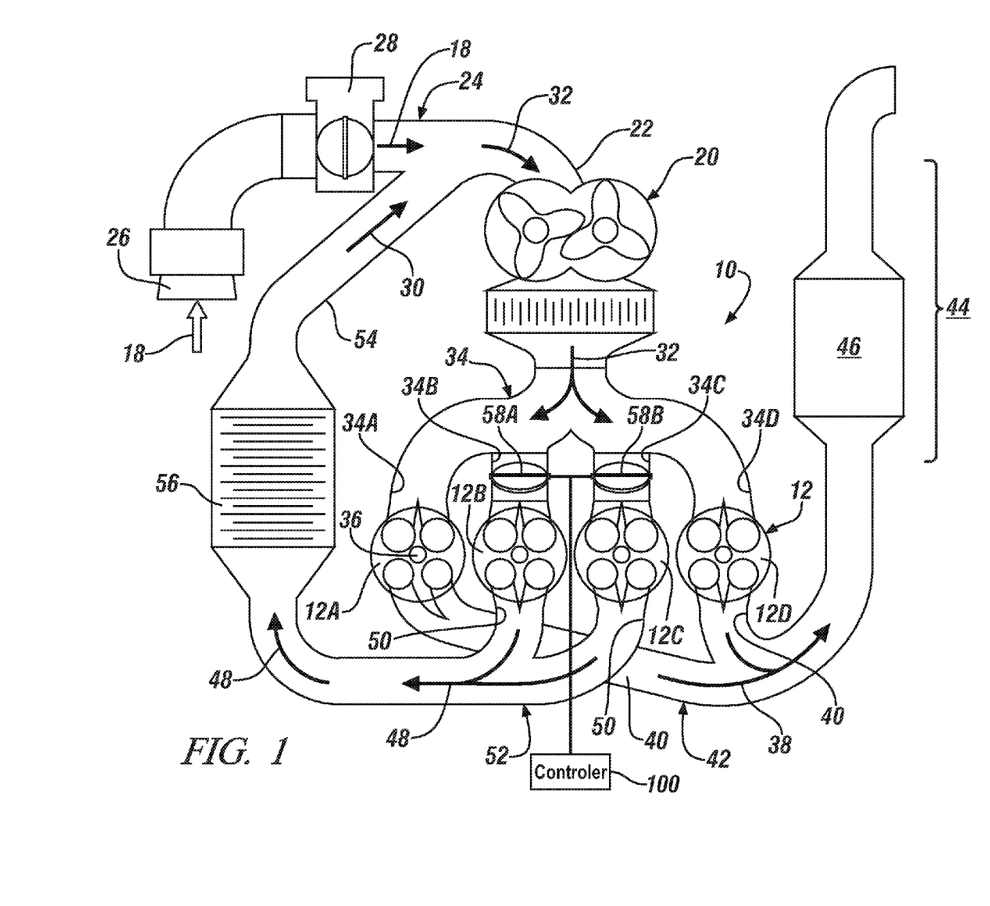
FIG. 1 is a schematic view of portions an internal combustion engine system embodying features of the invention.

Referring now to FIG. 1, and for purposes of description only, an exemplary embodiment of the invention is directed to an in-line 4-cylinder internal combustion engine system 10 comprising a plurality of engine cylinders 12 In the embodiment illustrated, the internal combustion engine system 10 is an in-line internal combustion engine including four engine cylinders 12, however the configuration may also include any number of cylinders as well as other configurations such as V-configured, horizontally opposed and the like, without affecting the application of the invention thereto.

Referring to the engine cylinders 12 in the embodiment shown, the individual cylinders are numbered cylinder #1, 12A (working cylinder), cylinder #2, 12B (EGR cylinder), cylinder #3 12C (EGR cylinder), and cylinder #4, 12D (working cylinder). Combustion air 18 enters an intake system 24 through inlet 26 and is metered by a throttle body 28 in a known manner. The metered combustion air 18 is mixed with an exhaust gas diluent referred to generally as recirculated exhaust gas or EGR 30 to form a combustion charge 32 comprising a mixture of combustion air 18 and EGR 30.

Figure 5:
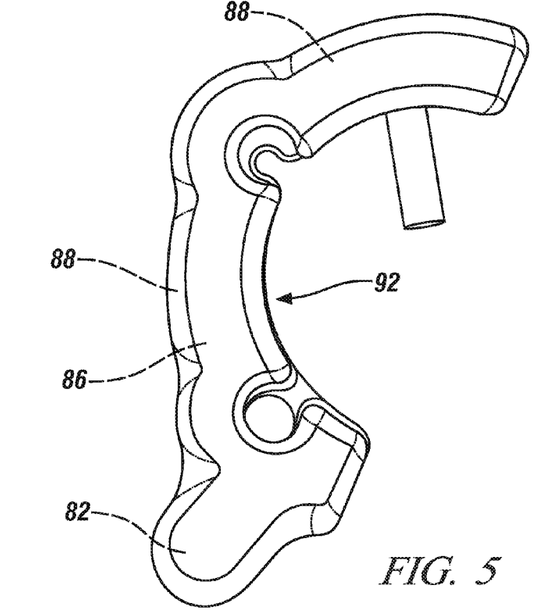
FIG. 5 is a plan view of a casting core used in the manufacture of portions of the invention.
Figure 6:
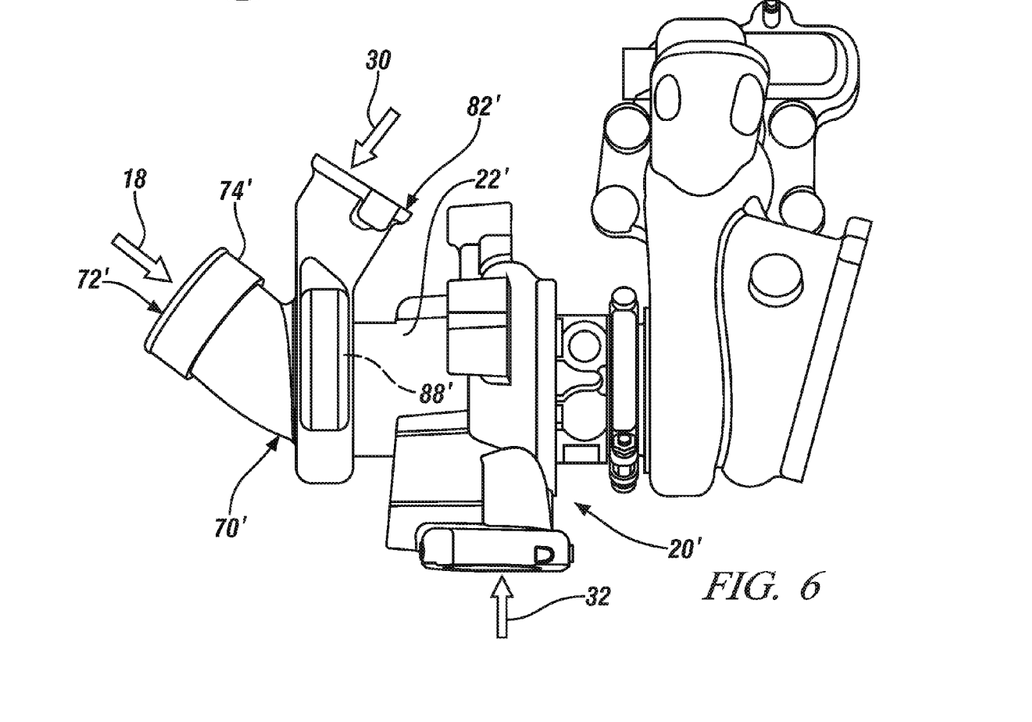
FIG. 6 is a side view of another embodiment of a compressor inlet assembly embodying features of the invention.
Figure 7A:
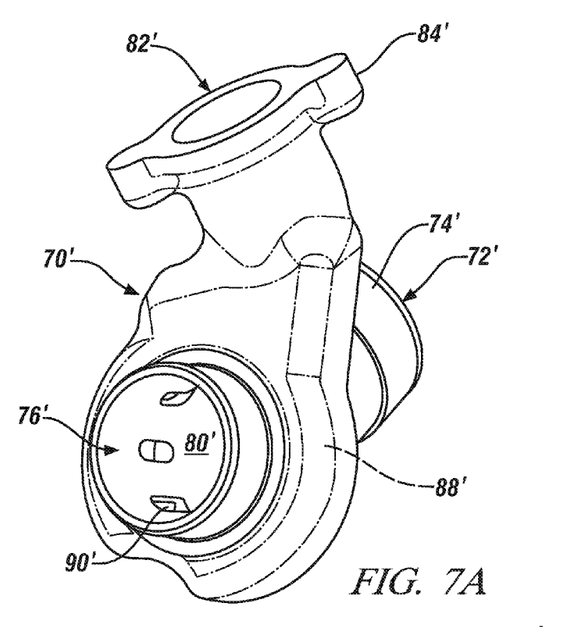
FIGS. 7A and 7B are front and rear views of another embodiment of a compressor inlet assembly embodying features of the invention.
Figure 7B:
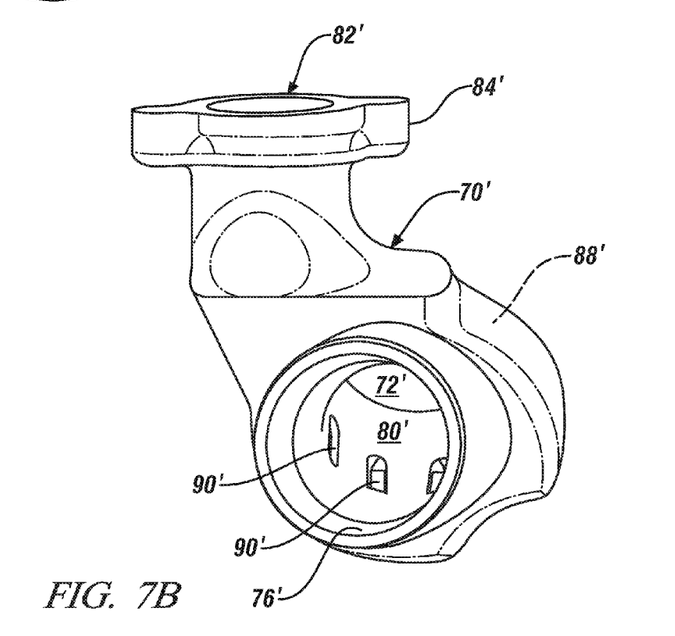
Figure 8:
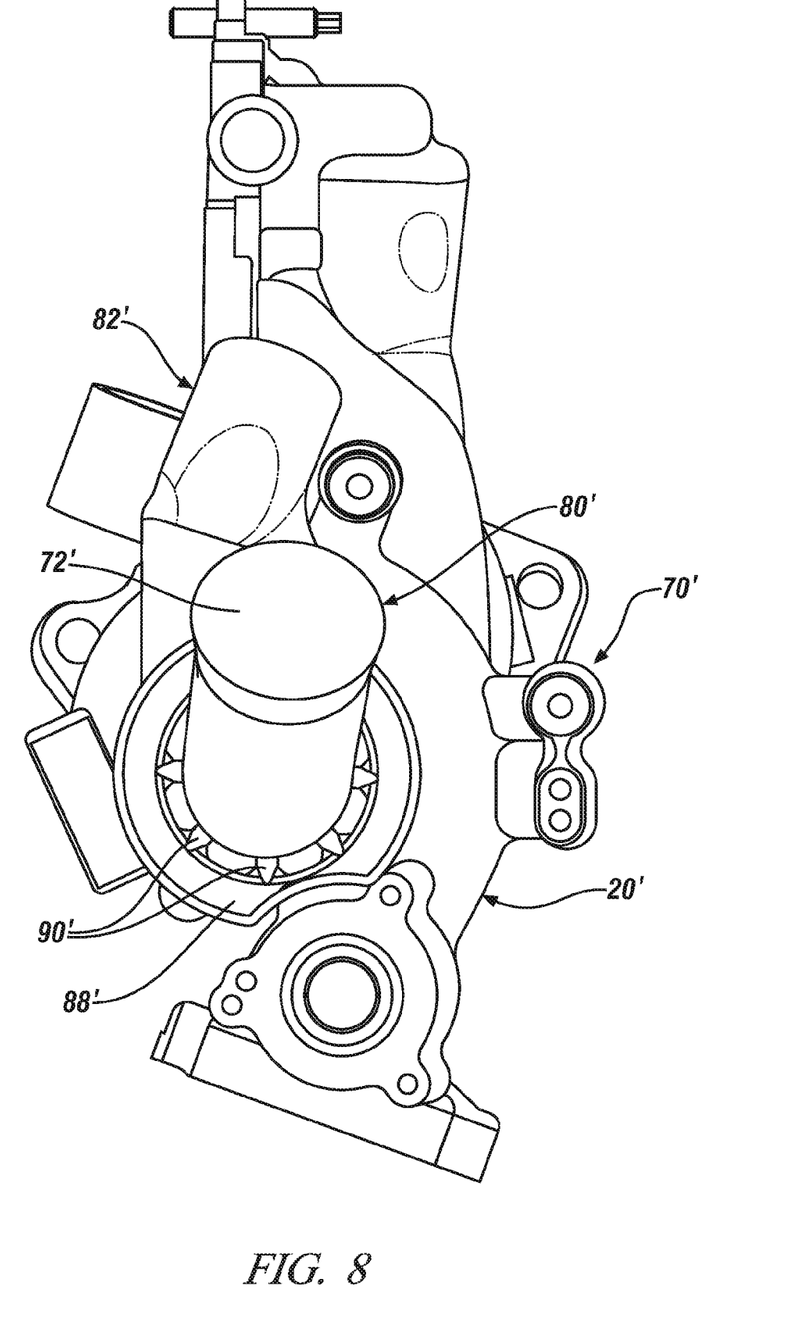
FIG. 8 is a side view of the engine driven turbocharger of FIG. 6 with the compressor inlet assembly illustrated in a negative, or core, view.

The combustion charge 32 is compressed by a compressor 20, 20' which, in the exemplary embodiment shown in FIGS. 1-5 is an engine driven supercharger 20 and in FIGS. 6-8 is an exhaust driven turbocharger 20', is delivered to each of the engine cylinders 12 through an intake manifold 34 comprising a plurality of intake runners 34A, 34B, 34C and 34D corresponding to engine cylinders 12A-12D, respectively. The combustion charge 32 is mixed with fuel in the cylinders 12 and is combusted therein. One or more ignition devices such as spark plugs 36 may be located in communication with the cylinders 12 and operate to ignite the fuel/air mixture therein.

In an exemplary embodiment, exhaust gas 38 from the combustion of fuel and combustion charge 32 in the working cylinders 12A and 12D (cylinders #1 and #4) exits the cylinders through the exhaust passages 40 of a first exhaust manifold 42. The exhaust manifold 42 is in fluid communication with an exhaust treatment system 44 that may include one or more exhaust treatment devices (ex. oxidation catalyst device, selective catalyst reduction device, particulate trap, or a combination thereof) 46 for the oxidation, reduction or filtering of exhaust constituents prior to the release of the exhaust gas to the atmosphere. Exhaust gas 48 from the combustion of fuel and combustion charge 32 in the EGR cylinders 12B and 12C (cylinders #2 and #3) exits the cylinders through the exhaust passages 50 of a second exhaust manifold 52. The exhaust manifold 52 is in fluid communication with EGR supply conduit 54 which delivers the exhaust gas as EGR 30 to the intake system 24. An EGR cooler 56 may be disposed within the EGR supply conduit 54 to cool the exhaust gas 48 prior to its reintroduction into the intake system as EGR 30 and mixing with the combustion air 18.

Referring to FIGS. 1-4, the EGR supply conduit 54 is configured to deliver EGR 30 to the intake system 24 adjacent to the inlet 22 of the compressor 20. Delivery of the EGR at this location allows for maximum EGR delivery due to the low pressure conditions created at the inlet of the compressor. It is desirable to deliver the EGR 30 in a manner that promotes thorough mixing of the EGR with the combustion air 18 as the combustion charge (a mixture of EGR and combustion air) passes through and is compressed by the compressor 20. To facilitate such delivery and mixing of the EGR 30, a compressor inlet assembly 70 comprises a combustion air inlet opening 72 that is in fluid communication with, and receives combustion air from the intake system 24. A flange member 74 surrounds the inlet opening 72 and includes means such as through-holes 75 for receiving bolts (not shown) or other suitable fasteners, for sealing attachment of the compressor inlet assembly 70 to the intake system 24. A combustion charge passage 73 extends through the compressor inlet assembly to a combustion charge outlet 76 that is located downstream of the combustion air inlet opening 72 and is configured for fluid communication with the compressor 20 for delivery of the combustion charge thereto. The charge outlet 76 opens through a sealing face 78 for sealing attachment of the compressor inlet assembly 70 to the compressor 20.

Disposed within the inlet assembly 70, between the combustion air inlet opening 72 and the combustion charge outlet 76, is an EGR mixing conduit 80. In an exemplary embodiment, the EGR mixing conduit 80 comprises an EGR inlet 82 that is configured for fluid communication with, and receipt of EGR 30 from, the EGR supply conduit 54. A flange portion 84 extends about the opening and is configured for sealing engagement with the EGR supply conduit 54 through the use of suitable fasteners (not shown). The EGR mixing conduit 80 extends from the EGR inlet 82 to an EGR supply annulus 88 that is disposed about the combustion air inlet opening 72. A plurality of EGR ports 90 extend between the EGR supply annulus 88 and the combustion charge passage 73 to thereby fluidly connect the EGR supply annulus 88 therewith.

In an exemplary embodiment, the cylinder firing order of the internal combustion engine 10 may be working cylinder #1, 12A, EGR cylinder #3, 12C, working cylinder #4, 12D and EGR cylinder #2, 12B. As a result of this firing order, the cylinders supplying EGR 30 to the intake system 24 (i.e. cylinders 12B and 12C) fire between the combustion events of the working cylinders 12A and 12D thereby providing a consistent flow of EGR 30 to the EGR inlet 82 for delivery to, and mixing with, combustion air 18 through the EGR ports 90 of the EGR supply annulus 88. The distribution of the EGR ports 90 about the combustion charge passage 73 assures a consistent delivery of EGR 18 to the combustion air 18 entering the compressor inlet assembly 70 through the combustion air inlet opening 72. As such, the combustion charge 32 comprises a homogeneous mixture of combustion air 18 and EGR 30 when delivered to the cylinders 12 during operation of the internal combustion engine 10.

Referring again to FIG. 1, in an exemplary embodiment, intake runners 34B and 34C of the intake manifold 34 may include one or more electronically controlled throttle bodies 58A and 58B respectively. The electronically controlled throttle bodies 58A and 58B are in signal communication with a controller 100 monitors various engine and exhaust system parameters and adjusts the flow of combustion charge into the EGR cylinders 12B and 12C to thereby adjust the composition of the combustion charge entering the EGR cylinders 12B, 12c with the result that the exhaust gas 48 exiting the EGR cylinders is optimized for the working cylinders 12A and 12B.

Figure 2:
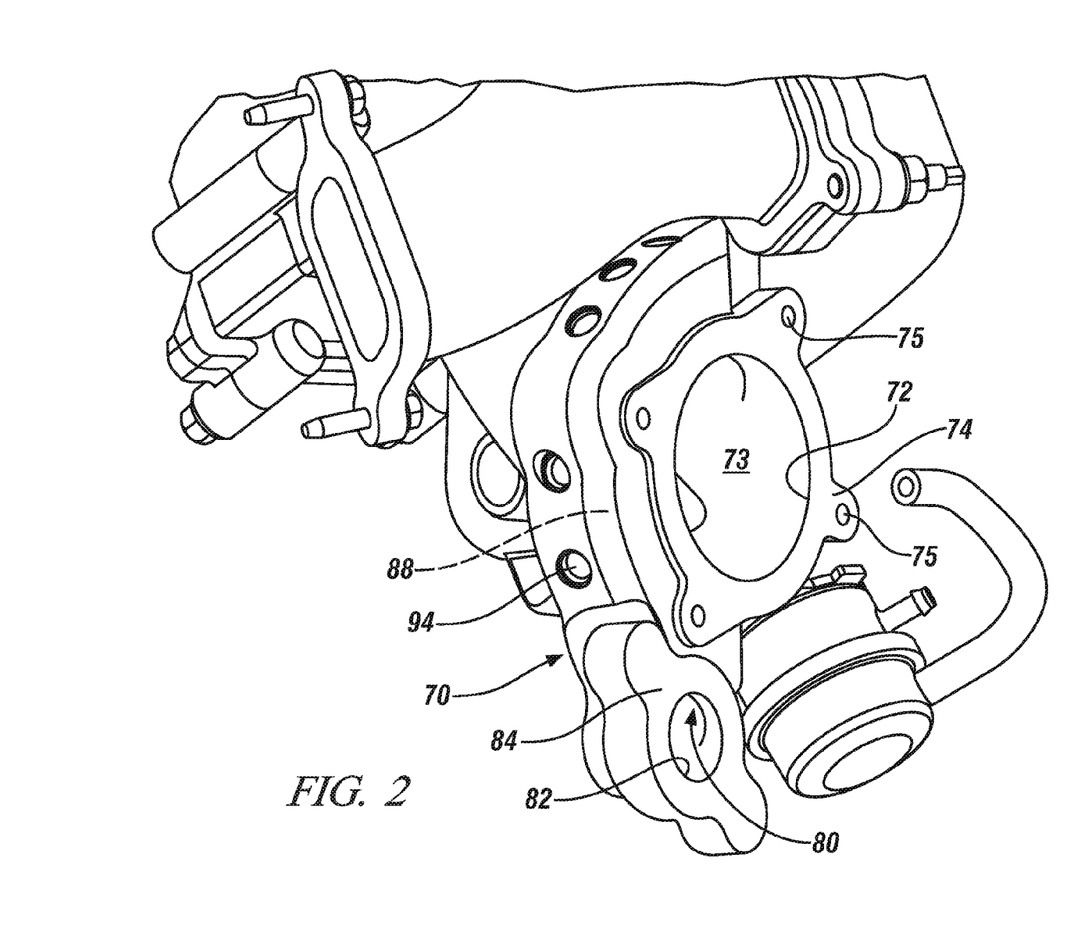
FIG. 2 is a perspective view of a compressor inlet assembly embodying features of the invention.
Figure 3:
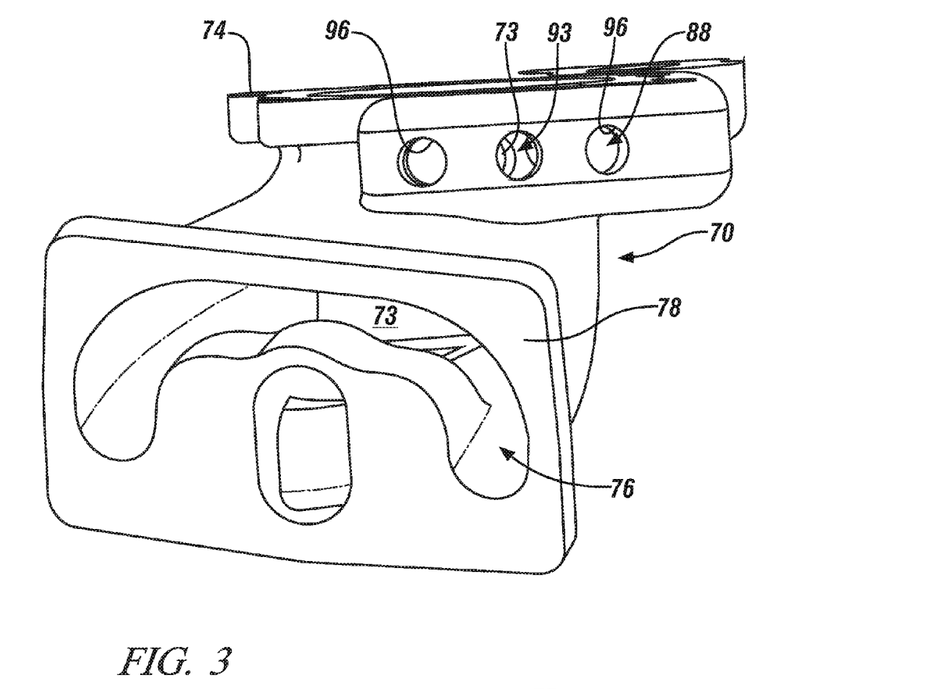
FIG. 3 is a downstream view of a compressor inlet assembly embodying features of the invention.
Figure 4:
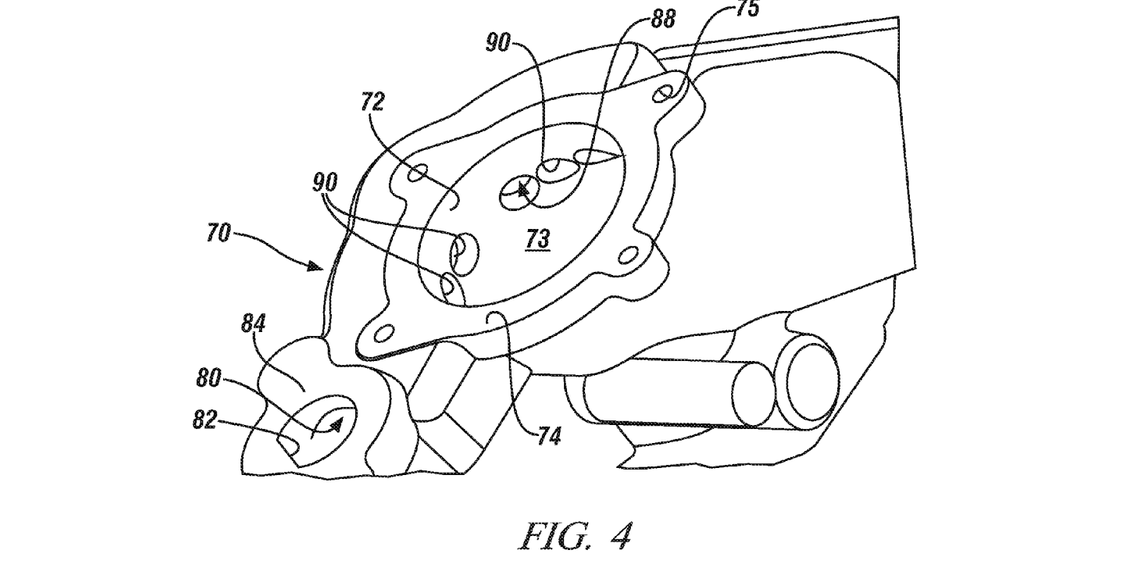
FIG. 4 is an upstream view of a compressor inlet assembly embodying features of the invention.

Referring now to FIGS. 2, 3 and 5, in an exemplary embodiment, the compressor inlet assembly 70 may be a cast, one piece assembly. The EGR passage 86 and supply annulus 88 of the compressor inlet assembly 70 may be manufactured utilizing a casting core 92 that results in the formation, following the casting process, of the EGR passage and the supply annulus. The EGR ports 90 are subsequently through-drilled 93, FIG. 3, from the exterior of the compressor inlet assembly 70 and into the combustion air passage 72. The EGR ports 90 may include diameters of varying dimension in order to balance the flow of exhaust gas from the supply annulus 88 into the combustion air passage 72. Plugs 94, FIG. 2, are subsequently inserted into the external openings 96 of the through-drilled ports 93, FIG. 3, to prevent leakage of the EGR 30 out of the compressor inlet assembly 70. As such, a low cost manufacturing process is provided.

Referring to FIGS. 1 and 6-8, in another exemplary embodiment, the EGR supply conduit 54 is configured to deliver EGR 30 to the intake system 24 adjacent to the inlet 22' of the compressor 20' (in this case an exhaust driven turbocharger). Delivery of the EGR 30 at this location allows for maximum EGR delivery due to the low pressure conditions created at the inlet of the compressor 20'. It is desirable to deliver the EGR 30 in a manner that promotes thorough mixing of the EGR with the combustion air 18 as the combustion charge 32 (a mixture of EGR 30 and combustion air 18) passes through and is compressed by the compressor 20'. To facilitate such delivery and mixing of the EGR 30, a compressor inlet assembly 70' comprises a combustion air inlet opening 72' that is in fluid communication with, and receives combustion air from the intake system 24. A flange member 74' surrounds the inlet opening 72' and is configured for sealing attachment of the compressor inlet assembly 70' to the intake system 24. A combustion charge passage 73' (shown in negative in FIG. 8) extends through the compressor inlet assembly 70' to a combustion charge outlet 76' that is located downstream of the combustion air inlet opening 72' and is configured for fluid communication with the compressor 20' for delivery of the combustion charge 32 thereto. The air outlet 76' is configured for sealing attachment of the compressor inlet assembly 70' to the compressor 20'.

Disposed within the inlet assembly 70', between the combustion air inlet opening 72' and the combustion charge outlet 76', is an EGR mixing conduit 80'. In an exemplary embodiment, the EGR mixing conduit 80' comprises an EGR inlet 82' that is configured for fluid communication with, and receipt of EGR 30 from, the EGR supply conduit 54. A flange portion 84' extends about the opening and is configured for sealing engagement with the EGR supply conduit 54 through the use of suitable fasteners (not shown). The EGR mixing conduit 80' extends from the EGR inlet 82' to an EGR supply annulus 88' that is disposed about the combustion air inlet opening 72'. A plurality of EGR ports 90' extend between the EGR supply annulus 88' and the combustion air passage 73' to thereby fluidly connect the EGR supply annulus therewith. The EGR ports 90' may include diameters of varying dimension in order to balance the flow of exhaust gas from the supply annulus 88' into the combustion air inlet opening 72'.

The distribution of the EGR ports 90' about the combustion air passage 73' assures a consistent delivery of EGR 30 to the combustion air 18 entering the compressor inlet assembly 70' through the combustion air inlet opening 72'. As such, the combustion charge 32 comprises a homogeneous mixture of combustion air 18 and EGR 30 when delivered to the cylinders 12 during operation of the internal combustion engine 10.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. An internal combustion engine comprising:
a working cylinder;
an EGR cylinder;
an intake system for supplying a combustion air charge to the cylinders;
a first exhaust system for removing exhaust gas from the working cylinder and to the atmosphere;
a second exhaust system for removing exhaust from the EGR cylinder and supplying the exhaust gas through an EGR supply conduit to the intake system;
a compressor disposed in the intake system and configured to compress the combustion air and deliver it to the working cylinder and the EGR cylinder;
a compressor inlet assembly having a combustion air inlet opening, in fluid communication with, and configured to receive combustion air from the intake system;
a combustion air passage extending through the compressor inlet assembly to a combustion air charge outlet located downstream of the combustion air inlet opening and configured for fluid communication with the compressor;
an EGR mixing conduit disposed within the compressor inlet assembly and having an EGR inlet configured for fluid communication with, and receipt of EGR from, the EGR supply conduit and an EGR passage extending from the EGR inlet to an EGR supply annulus disposed about the combustion air inlet opening; and
a plurality of EGR ports extending between the EGR supply annulus and the combustion air passage to thereby fluidly connect the EGR supply annulus therewith for delivery of EGR thereto, wherein the combustion air delivered to the cylinders is a combination of combustion air and EGR.

2. The internal combustion engine of claim 1, wherein the compressor is driven by exhaust gas flowing through the first exhaust system.

3. The internal combustion engine of claim 1, wherein the EGR passage and supply annulus of the compressor inlet assembly are manufactured utilizing a casting core that results in the formation, following the casting process, of the EGR passage and the supply annulus.

4. The internal combustion engine of claim 3, wherein the EGR ports are through-drilled from the exterior of the compressor inlet assembly and into the combustion charge passage.

5. The internal combustion engine of claim 4 wherein plugs are inserted into external openings of the through-drilled ports.

6. The internal engine of claim 1, wherein the EGR ports include diameters of varying dimension in order to balance the flow of exhaust gas from the EGR supply annulus into the combustion charge passage.

7. An internal combustion engine comprising:
a working cylinder;
an EGR cylinder;
a compressor disposed in an intake system of the internal combustion engine and configured to compress a combustion air charge and deliver the combustion air charge through a first intake runner to the working cylinder and through a second intake runner to the EGR cylinder;
a throttle body disposed in the second intake runner for controlling a quantity of the combustion air charge supplied to the EGR cylinder;
a compressor inlet assembly having a combustion air inlet opening, in fluid communication with, and configured to receive combustion air from an intake system of the internal combustion engine;
a combustion air passage extending through the compressor inlet assembly to a combustion air outlet located downstream of the combustion air inlet opening and configured for fluid communication with the compressor;
an EGR mixing conduit disposed within the compressor inlet assembly and having an EGR inlet configured for fluid communication with, and receipt of EGR from, an EGR supply conduit, an EGR passage extending from the EGR inlet to an EGR supply annulus disposed about the combustion air inlet opening; and
a plurality of EGR ports extending between the EGR supply annulus and the combustion passage to thereby fluidly connect the EGR supply annulus therewith for delivery of EGR thereto, wherein the combustion air delivered to the cylinders is a combination of combustion air and EGR;
further comprising a controller in signal communication with the throttle body, the controller configured for monitoring one or more engine and exhaust system parameters and adjusting a flow of combustion air charge to the EGR cylinder.

8. The internal combustion engine of claim 7, further comprising: an exhaust system, wherein the compressor is driven by exhaust gases flowing through the exhaust system.

9. The internal combustion engine of claim 7, wherein The EGR passage and supply annulus of the compressor inlet assembly are manufactured utilizing a casting core that results in the formation, following the casting process, of the EGR passage and the supply annulus.

10. The internal combustion engine of claim 9, wherein the EGR ports are through-drilled from the exterior of the compressor inlet assembly and into the combustion charge passage.

11. The internal combustion engine of claim 10, wherein plugs are inserted into external openings of the through-drilled ports.

12. The internal engine of claim 7, wherein the EGR ports include diameters of varying dimension in order to balance the flow of exhaust gas from the EGR supply annulus into the combustion charge passage.

* * * * *